Figure 1:
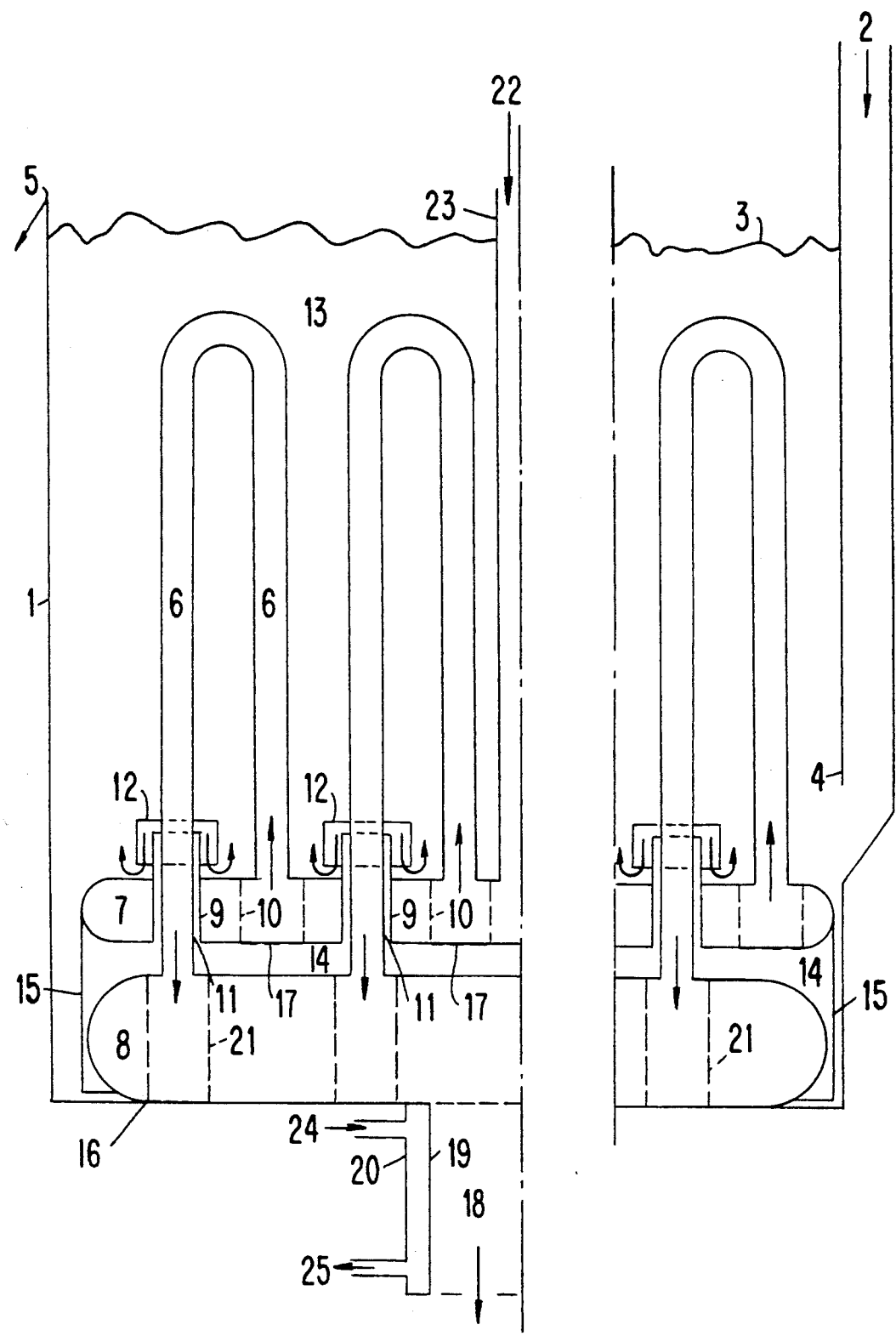

United States Patent [19]
Collin et al.

[11] Patent Number: 5,251,691
[45] Date of Patent: Oct. 12, 1993

[54] DEVICE FOR THE INDIRECT HEATING OF AIR

[76] Inventors: Per Collin, Orrspelsuägen 4, S-182 75 Stocksund; Mans Collin, Telegrafgatan 33, S-149 00 Nynäshamn, both of Sweden

[21] Appl. No.: 820,626
[22] PCT Filed: Jun. 21, 1990
[86] PCT No.: PCT/SE90/00452
§ 371 Date: Jan. 23, 1992
§ 102(e) Date: Jan. 23, 1992
[87] PCT Pub. No.: WO90/15963
PCT Pub. Date: Dec. 27, 1990
[51] Int. Cl.⁵ ............................. F28C 3/16; F23D 1/00
[52] U.S. Cl. .................................. 165/104.16; 110/263; 110/347; 122/4 D
[58] Field of Search .............. 165/104.16; 60/682, 60/683, 684; 110/263, 347; 122/4 D

[56] References Cited
U.S. PATENT DOCUMENTS

| | | | |
|---|---|---|---|
| 3,982,901 | 9/1976 | Steever et al. | 165/104.16 |
| 4,287,156 | 9/1981 | DeFeo | 165/104.16 |
| 4,292,023 | 9/1981 | DeFeo et al. | 165/104.16 |
| 4,377,072 | 3/1983 | Campbell, Jr. et al. | 165/104.16 |
| 4,530,290 | 7/1985 | Comparato | 34/57 A |

Primary Examiner—Albert W. Davis, Jr.
Attorney, Agent, or Firm—Michael N. Meller

[57] ABSTRACT

A device for the indirect heating of air or another gas at high pressure to a high temperature, consisting of a heat exchanger of a special construction submerged in a fluid bed of the "classical type", through which flows a fluidized hot, finely powdered bed material which is introduced (2) below the bed surface (3) and discharged through an overflow (5). The heat exchanger surface is formed by hairpin-shaped tubes (6) with legs of unequal length, the shorter legs thereof discharging into the upper bottom of an inlet chamber (7) and the longer legs thereof extending down through a tubular lead-through (9) between the bottoms of said inlet chamber (7), which lead-through is concentric with said tube leg and opens into the upper bottom of an outlet chamber (8), with an annular channel between said tube (6) and said lead-through (9). A bell (12) is secured to each of the long legs above the lead-through (9), forming together with the annular channel (11) a distribution means of "bubble cap" type for the fluidizing air supplied to the fluid bed (13). The low space (14) between the pressure chambers is separated from the fluid bed and is supplied with a small air flow, which through the annular channels (11) bubbles out below the "bells" (12) and fluidizes the bed (13). The invention is also related to the use of said device for the indirect heating of gas, especially air.

20 Claims, 1 Drawing Sheet

DEVICE FOR THE INDIRECT HEATING OF AIR

Indirect heating of large flows of air with high pressure (10-30 bars) to high temperature (750°-850° C.) is of interest in connection with power generation based on solid fuels, especially coal, comprising combinations of gas and steam turbines in purpose of reaching high efficiency.

The present invention relates to a device advantageous for said heating comprising a specially designed heat exchanger submerged in a fluid bed of classical type through which fine-grained hot bed material, as an example coal ash, is flowing, which material has been heated to a high temperature by combustion of pulverized coal in mixture with the bed material.

The fluidized bed is maintained at $0.6 < \epsilon < 0.7$ ($\epsilon$ = voidage) in a chamber with a preferably rectangular horizontal section, which is supplied with hot bed material, preferably below the bed surface, in the vicinity of one of the chamber walls and from which chamber the bed material flows over a weir in the opposite chamber wall.

According to the invention the heat exchanger surface consists of an adapted number of hairpin bent tubes, which for reason of strength and cost preferably have an inner diameter of 20-80 mm. The "hairpins" have straight vertically downward pointing legs of differing length which are fastened to separate disc shaped pressure chambers—one upper inlet chamber and one lower outlet chamber—each with horizontal between themselves connected plane parallel walls and sides with preferably half circular section. The short leg of the "hairpins" opens into the upper wall of the inlet chamber while the long leg extends down through a tube shaped conduit between the horizontal walls of the inlet chamber and opens into the upper horizontal wall of the outlet chamber.

According to the invention the tube shaped conduit is fastened to the horizontal walls of the inlet chamber concentrically with the long leg and has such a length that it extends to an adapted level above the upper horizontal wall of the inlet chamber and has such an inner diameter that an annular channel with suitable width is formed between the tube leg and the conduit. The latter acts simultaneously as a fortifying element between the horizontal walls of the inlet chamber.

Another characteristic feature of the device according to the invention are bubblecaps with a suitably toothed lower edge which are fastened-to the long leg at an adapted level above the upper edge of the conduits. Together the bubblecaps and the annular channels form suitable distributors for the feeding of the fluidizing air to the fluid bed in which the heat exchanger is submerged.

The device according to the invention has a low space between the pressure chambers separated from the fluid bed preferably by a "skirt" that extends from the sides of the inlet chamber past the sides of the outlet chamber and ends somewhere at approximately the level of the lower horizontal wall of the outlet chamber. The fluidizing of the bed, in which the heat exchanger is submerged, is done with a small adapted flow of gas that is fed into the space between the pressure chambers and flows up through the annular channels and out below the toothed lower edge of the bubblecaps, thereby fluidizing the bed.

A simple way of feeding a fluidizing flow of air to the space between the pressure chambers is by tapping an adapted flow from the inlet chamber through one or more small holes with adapted diameter in the lower horizontal wall of the chamber.

Because of the high temperature of the bed material ($> 800°$ C.) and the outlet air together with the high pressure, a large part of the tube's surface and the whole outlet chamber reaches a high temperature. This means that only walls made of heat-resistant alloys, i.e. Incoloy 800 H, match the strains with reasonable wall thickness.

By using tubes with comparatively small diameter (20-80 Mm) the wall thickness will be very reasonable, which is of importance because of the high specific material cost.

The outlet chamber, where the hot air from the "hairpins" is collected, is like the inlet chamber disc shaped with plane parallel horizontal walls (bottoms) and sides with half circular section, which enables fortifying the walls between themselves with an adapted number of fortifying elements and as tubes, bolts etc. For welding reasons, tube shaped fortifying elements are preferred, whereby the fortifying elements at the center of (in line with) the hairpin tubes have a larger diameter than the outer diameter of the hairpin tubes and are perforated with several holes, the total openings of which is $>2$ times the tube section area.

The pressurized air entering the inlet chamber is according to the invention piped vertically down through the bed, which pipe preferably opens into the center point of the upper horizontal wall of the inlet chamber. Because the air after the compressor has a reasonable temperature (300°-400° C.) the wall temperature of the feeding pipe will be comparatively low and the necessary wall thickness moderate.

The hot pressurized air in the outlet chamber is preferably tapped through a vertically downward pointing pipe centrally fastened to the lower horizontal wall of the chamber. The volume flow here is as a consequence of the high temperature almost double the feed flow and the pipe diameter must be relatively large in order to get reasonable gas velocity. By making the pipe according to the invention with a double wall, an outer pressure resistant wall manufactured of normal pressure vessel material and an inner thin wall manufactured of heat-resistant material and flush the space between the walls with pressurized cooling air, the problem can be solved. The heated cooling air can for instance with advantage be used as combustion air.

In order to further elucidate the invention an embodiment thereof is now described in connection with FIG. 1:

The device according to FIG. 1 comprises a fluid bed chamber 1 with rectangular horizontal section in which a fluidized bed 13 is maintained at $0.6 < \epsilon < 0.7$, the bed material of which essentially consists of finely divided coal from combustion of pulverized coal and which is fed through an inlet tube 2 into the bed 13 at 4 below the surface 3 of the bed and leaves the bed over the weir 5.

In the fluidized bed 13 a heat exchanger is submerged. Its heat exchanging surface is made of an adapted number of "hairpin" bent vertical tube elements 6 with legs of different length fastened in and opening into separate disc shaped pressure chambers—an upper inlet chamber 7 and an outlet chamber 8 situated just below—each with plane parallel horizontal walls fortified between themselves with tube shaped fortifying elements 10 and sides with half circular section. The "hairpin" tubes' 6 short legs open into and are welded to the upper horizontal wall of the inlet chamber while the long legs extend through tube shaped conduits 9 welded between the horizontal walls of the outlet chamber 7, whereby the long legs open into and are welded to the upper horizontal wall of the outlet chamber 8. The conduits 9 have such length that they extend to an adapted level above the upper horizontal wall of the inlet chamber 7 and such inner diameter that annular channels 11 with adapted width are formed between the long tube legs and said conduits.

At adapted level above the upper end of the conduits 9 a bubblecap 12 with toothed lower edge is fastened on every long leg. These caps form together with the annular channels 11 the distributor for the fluidizing air to the bed 13, which is tapped from the inlet chamber 7 through holes 17. In order to keep the space 14 between the pressure chambers free from bed material the space 14 is separated from the fluidized bed 13 by the "skirt" 15.

In order to withstand the strains, that the pressure chambers are exposed to by the high pressure and high temperature, the horizontal (disc shaped) walls of the pressure chambers are fortified between themselves by fortifying elements 21 shaped as perforated tubes at the center of (in line with) the tube leg openings and as bolts or tubes elsewhere. The sides of the pressure chambers have half circular section in order to withstand the strains.

The supply of pressurized air 22 to the heat exchanger, usually with a temperature of 300°–400° C., is done through a vertical pipe 23 down through the bed 13, said tube opening centrally into and being welded to the upper horizontal wall of the inlet chamber 7. The discharge of hot air from the outlet chamber 8 is done through a vertically downward pointing centrally placed pipe 18 welded to the lower horizontal wall 16 of the chamber. The pipe has a double wall 20+19 with cooling by passing pressurized air between the walls.

We claim:

1. A device for indirect heating of air or other gases of high pressure to high temperature particularly suitable for large flows, comprising a heat exchanger of special design submerged in a fluidized bed of "classical" type, through which finely comminuted bed material is flowing, which bed material, as an example, has been heated by combustion of coal in mixture with the bed material, wherein:
   a) the fluidized bed is maintained in a chamber which is supplied with hot bed material below the bed surface and from which chamber the bed material flows over a weir;
   b) the heat exchanger surface consists of an adapted number of hairpin bent tubes with vertical downward pointing legs of different length opening into and fastened to separate disc shaped pressure chambers—an upper inlet chamber and an outlet chamber situated just below—each with plane parallel horizontal walls fortified between themselves by fortifying elements and sides with half circular section, whereby the short leg of the hairpin tubes opens into the upper horizontal wall of the inlet chamber while the long leg extends down through a tube shaped conduit between the horizontal walls of the inlet chamber and opens into the upper horizontal wall of the outlet chamber;
   c) the tube shaped conduit of the inlet chamber is fastened between the horizontal walls of the chamber concentrically with the long leg of the hairpin bent tube extending therethrough and has such length, that it extends above the upper horizontal wall of the inlet chamber and has such inner diameter, that an annular channel with adapted width is formed between the tube leg and the conduit;
   d) a bubblecap is fastened on every long leg at an adapted level above the upper end of the conduit, thereby together with the annular channel forming a suitable distributor of bubblecap type for the fluidizing air of the bed in which the heat exchanger is submerged.

2. A device according to claim 1, wherein the low space between the pressure chambers is separated from the fluidized bed by a "skirt" extending down from the sides of the inlet chamber past the sides of the outlet chamber ending at about the level of the lower horizontal wall of the outlet chamber and wherein a small adapted flow of gas is fed into the space, which flow via the annular channel bubbles out below the bubble-cap and fluidizes the bed.

3. A device according to claim 2, wherein the plane horizontal walls of the pressure chambers are fortified between themselves with fortifying elements, whereby elements at the center of the hairpin tubes are tube shaped with an inner diameter larger than the outer hairpin tube diameter and with perforated jacket, the total area of the holes being greater than 2 times the section area of the hairpin tube.

4. A device according to claim 3, wherein the hot air is tapped from the bottom of the outlet chamber through a downward pointing pipe, which has an outer pressure resisting wall and an inner thin wall of heat-resistant material, whereby the space between the walls is flushed with pressurized cooling air.

5. A device according to claim 2, wherein the hot air is tapped from the bottom of the outlet chamber through a downward pointing pipe, which has an outer pressure resisting wall and an inner thin wall of heat-resistant material, whereby the space between the walls is flushed with pressurized cooling air.

6. A device according to claim 2, wherein the small flow of gas fed to the space between the pressure chambers is tapped from one or several small holes with adapted diameter in the lower horizontal wall of the inlet chamber.

7. A process for the indirect heating of air which comprises the use of a device as defined in claim 2 for indirect heating of air or other oxidizing gas to a high temperature greater than 700° C.

8. A process according to claim 7, wherein the air is heated from the compressor of a gas turbine before it is fed to the expansion turbine of a gas turbine.

9. A device according to claim 1, wherein the plane horizontal walls of the pressure chambers are fortified between themselves with fortifying elements, whereby elements at the center of the hairpin tubes are tube shaped with an inner diameter larger than the outer hairpin tube diameter and with perforated jacket, the total area of the holes being greater than two times the section area of the hairpin tube.

10. A device according to claim 3, wherein the hot air is tapped from the bottom of the outlet chamber through a downward pointing pipe, which has an outer pressure resisting wall and an inner thin wall of heat-resistant material, whereby the space between the walls is flushed with pressurized cooling air.

11. A device according to claim 9, wherein the small flow of gas fed to the space between the pressure chambers is tapped from one or several small holes with adapted diameter in the lower horizontal wall of the inlet chamber.

12. A process for the indirect heating of air which comprises the use of a device as defined in claim 9 for indirect heating of air or other oxidizing gas to a high temperature greater than 700° C.

13. A device according to claim 1, wherein the hot air is tapped from the bottom of the outlet chamber through a downward pointing pipe, which has an outer pressure resisting wall and an inner thin wall of heat-resistant material, whereby the space between the walls is flushed with pressurized cooling air.

14. A device according to claim 13, wherein the small flow of gas fed to the space between the pressure chambers is tapped from one or several small holes with adapted diameter in the lower horizontal wall of the inlet chamber.

15. A process for the indirect heating of air which comprises the use of a device as defined in claim 13 for indirect heating of air or other oxidizing gas to a high temperature greater than 700° C.

16. A device according to claim 1, wherein the small flow of gas fed to the space between the pressure chambers is tapped from one or several small holes with adapted diameter in the lower horizontal wall of the inlet chamber.

17. A process for the indirect heating of air which comprises the use of a device as defined in claim 16 for indirect heating of air or other oxidizing gas to a high temperature greater than 700° C.

18. A process according to claim 17, wherein the air is heated from the compressor of a gas turbine before it is fed to the expansion turbine of a gas turbine.

19. A process for the indirect heating of air which comprises the use of a device as defined in claim 1 for indirect heating of air or other oxidizing gas to a high temperature greater than 700° C.

20. A process according to claim 19, wherein the air is heated from the compressor of a gas turbine before it is fed to the expansion turbine of a gas turbine.

* * * * *